United States Patent
Ekanadham et al.

(10) Patent No.: US 7,308,681 B2
(45) Date of Patent: Dec. 11, 2007

(54) CONTROL FLOW BASED COMPRESSION OF EXECUTION TRACES

(75) Inventors: Kattamuri Ekanadham, Mohegan Lake, NY (US); Pratap Pattnaik, Ossining, NY (US); Simone Sbaraglia, Mount Kisco, NY (US); Luiz A. DeRose, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 637 days.

(21) Appl. No.: 10/695,139

(22) Filed: Oct. 28, 2003

(65) Prior Publication Data

US 2005/0091643 A1    Apr. 28, 2005

(51) Int. Cl.
*G06F 9/44*    (2006.01)

(52) U.S. Cl. .............. 717/128; 717/130; 717/158; 717/161

(58) Field of Classification Search ............ 717/128, 717/130, 132, 133, 150, 151, 157, 158, 161
See application file for complete search history.

(56) References Cited

U.S. PATENT DOCUMENTS

| | | | | |
|---|---|---|---|---|
| 3,820,079 A * | 6/1974 | Bergh et al. | ............... | 710/112 |
| 4,325,120 A * | 4/1982 | Colley et al. | ............... | 711/202 |
| 4,445,177 A * | 4/1984 | Bratt et al. | ............... | 712/245 |
| 4,455,602 A * | 6/1984 | Baxter et al. | ............... | 710/5 |
| 4,493,027 A * | 1/1985 | Katz et al. | ............... | 712/228 |
| 4,525,780 A * | 6/1985 | Bratt et al. | ............... | 711/163 |
| 4,570,217 A * | 2/1986 | Allen et al. | ............... | 700/83 |
| 5,655,122 A * | 8/1997 | Wu | ............... | 717/152 |
| 5,704,053 A * | 12/1997 | Santhanam | ............... | 717/158 |
| 5,794,029 A * | 8/1998 | Babaian et al. | ............... | 712/241 |
| 5,797,013 A * | 8/1998 | Mahadevan et al. | ............... | 717/160 |
| 5,854,934 A * | 12/1998 | Hsu et al. | ............... | 717/161 |
| 6,070,009 A * | 5/2000 | Dean et al. | ............... | 717/130 |
| 6,092,180 A * | 7/2000 | Anderson et al. | ............... | 712/200 |
| 6,106,573 A * | 8/2000 | Mahalingaiah et al. | ............... | 717/128 |
| 6,202,199 B1 * | 3/2001 | Wygodny et al. | ............... | 717/125 |
| 6,282,701 B1 * | 8/2001 | Wygodny et al. | ............... | 717/125 |
| 6,397,379 B1 * | 5/2002 | Yates et al. | ............... | 717/140 |
| 6,507,947 B1 * | 1/2003 | Schreiber et al. | ............... | 717/160 |
| 6,539,541 B1 * | 3/2003 | Geva | ............... | 717/150 |
| 6,549,959 B1 * | 4/2003 | Yates et al. | ............... | 710/22 |
| 6,560,693 B1 * | 5/2003 | Puzak et al. | ............... | 712/207 |
| 6,658,578 B1 * | 12/2003 | Laurenti et al. | ............... | 713/324 |

(Continued)

OTHER PUBLICATIONS

SHADE: A Fast Instruction-Set Simulator for Execution Profiling, Robert F. Cmelik et al, 1993, 41 pages.*

(Continued)

*Primary Examiner*—Todd Ingberg
(74) *Attorney, Agent, or Firm*—Douglas W. Cameron; Anne Vachon Dougherty

(57) ABSTRACT

A method and apparatus for creating a compressed trace for a program, wherein events are compressed separately to provide improved compression and tracing. A sequence of events for a program is selected, and a sequence of values is then determined for each of the selected events occurring during an execution of the program. Each sequence of values is then compressed to generate a compressed sequence of values for each event. These values are then ordered in accordance with information stored in selected events (such as for example, branch events), where the ordered values correspond to the trace.

19 Claims, 5 Drawing Sheets

U.S. PATENT DOCUMENTS

| | | | |
|---|---|---|---|
| 6,742,179 B2* | 5/2004 | Megiddo et al. | 717/130 |
| 6,763,452 B1* | 7/2004 | Hohensee et al. | 712/227 |
| 6,779,107 B1* | 8/2004 | Yates | 712/229 |
| 6,789,181 B1* | 9/2004 | Yates et al. | 712/4 |
| 6,826,748 B1* | 11/2004 | Hohensee et al. | 717/130 |
| 6,871,341 B1* | 3/2005 | Shyr | 717/131 |
| 6,934,832 B1* | 8/2005 | Van Dyke et al. | 712/244 |
| 6,941,545 B1* | 9/2005 | Reese et al. | 717/130 |
| 6,954,923 B1* | 10/2005 | Yates et al. | 717/130 |
| 6,971,092 B1* | 11/2005 | Chilimbi | 717/158 |
| 6,978,462 B1* | 12/2005 | Adler et al. | 719/318 |
| 7,013,456 B1* | 3/2006 | Van Dyke et al. | 717/130 |
| 7,047,394 B1* | 5/2006 | Van Dyke et al. | 712/209 |
| 7,058,928 B2* | 6/2006 | Wygodny et al. | 717/128 |
| 7,065,633 B1* | 6/2006 | Yates et al. | 712/227 |
| 7,065,749 B2* | 6/2006 | Watanabe | 717/128 |
| 7,069,421 B1* | 6/2006 | Yates et al. | 712/209 |
| 7,080,283 B1* | 7/2006 | Songer et al. | 714/30 |
| 7,111,290 B1* | 9/2006 | Yates et al. | 717/158 |
| 7,137,110 B1* | 11/2006 | Reese et al. | 717/158 |

OTHER PUBLICATIONS

Compiler Transformations for High-Performance Computing, David F. Bacon et al, ACM, Dec. 1994, pp. 345-420.*

Turbo Profiler 2.0 Borland, User's Guide Chapters 1-2, 1991.*

Sigma:A Simulator Infrastructure to Guide Memory Analysis, by: Luiz Derose, K. Ekanadham, Jeffrey K. Hollingsworth and Simone Sbaraglia, pp. 1-13.

* cited by examiner

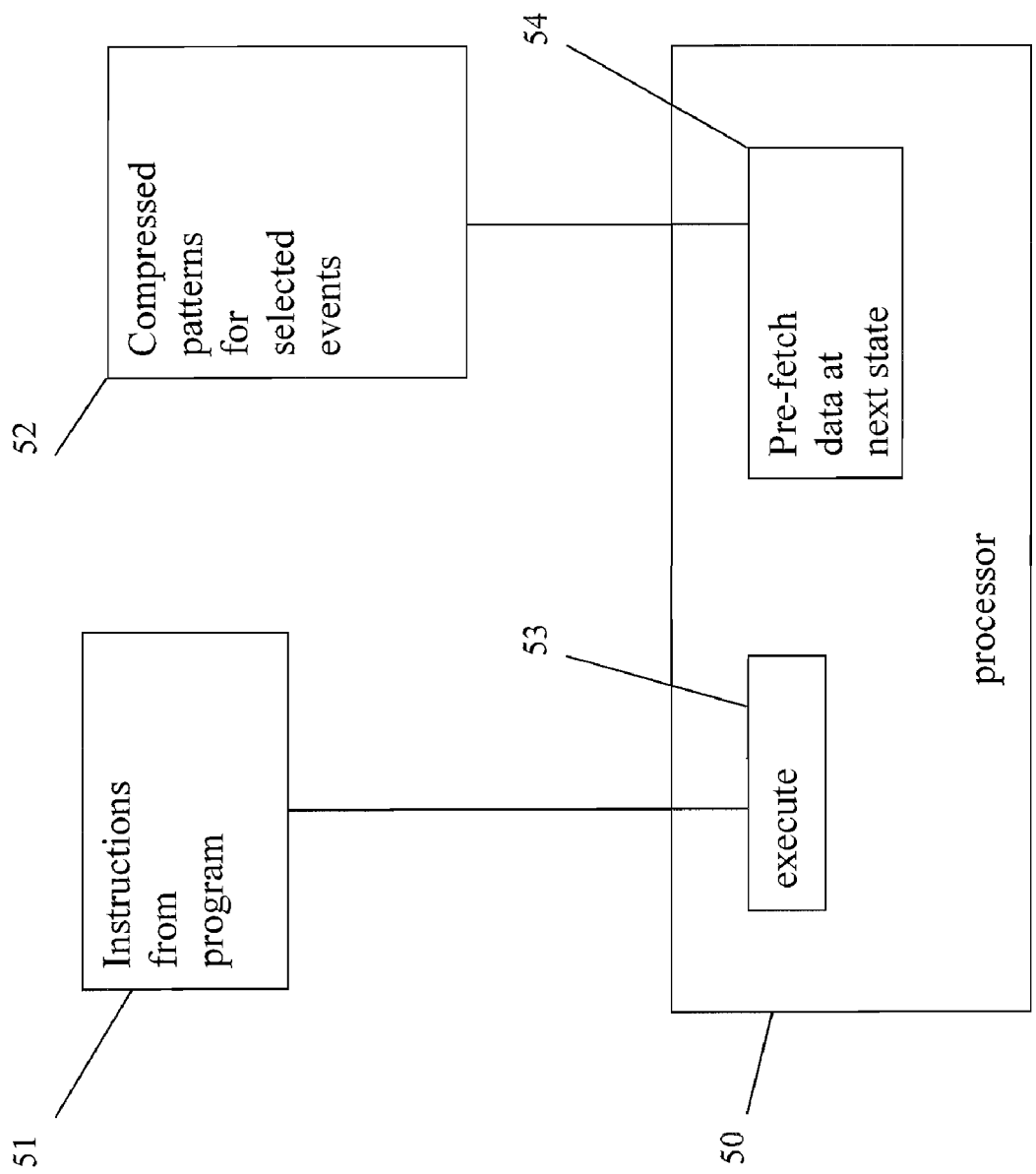

CONTROL FLOW BASED COMPRESSION OF EXECUTION TRACES

TECHNICAL FIELD

This invention relates to a method and apparatus for executing and tracing a program using a compact representation of instructions and memory references.

BACKGROUND OF THE INVENTION

Memory performance studies often employ address traces generated during an execution of a program, to analyze cache behaviors and their effects on program execution time. Address traces capture the order in which memory locations are accessed during execution; however, these traces typically do not carry any direct information on the control flow in the program. On the other hand, architectural studies use instruction traces, which capture the control flow of a program, but do not contain any address traces. Machine simulators often execute or interpret the instructions to obtain the addresses of locations referenced in the program.

In general, when traces get too large, space becomes a premium for their storage. In addition, if compression and de-compression are done off-line (i.e. producing a compressed trace from a given uncompressed trace and vice versa), the space problem is further accentuated. Furthermore, compressed traces often lose the flexibility to segment the traces so that individual segments can be examined or processed concurrently.

When compression is done on memory traces, they can capture certain repeated sequences of addresses and can fold them into compact representations. But, often, the compression mechanism breaks (That is, the memory trace can not be compressed effectively at these breaks.) when the sequence is interspersed with occasional references outside the recognized pattern. These references may be due to conditionals in the program or to loops whose bodies may have a mixture of strided and non-strided references.

Traditionally, the entire program trace was compressed, making it extremely difficult to relate values in the compressed trace to the structural components (such as blocks of the program) of the program. Thus trace analysis becomes cumbersome.

SUMMARY OF THE INVENTION

It is therefore an object of this invention to capture both the control flow as well as memory references of a program during execution.

It is therefore another object of this invention to facilitate the association of generalized events with each point in the control flow.

It is therefore another object of this invention to associate values with an event occurring during execution of a program.

It is therefore another object of this invention to provide an efficient compression mechanism for a program trace.

It is therefore another object of this invention to facilitate the composition of a trace of a program as a collection of segments of desired size, so that each segment of the trace can be accessed and processed independently.

Accordingly, this invention employs a compact representation of the execution trace of a program on a machine for tracing and executing the program.

More specifically, with this invention, values associated with each event are compressed separately, thereby providing improved compression.

More specifically, with this invention control flow is captured as a compressed sequence of values with branch events.

More specifically, one aspect of this invention is a method of generating a trace of a program. This method starts with defining a sequence of events for the program. The sequence of values is then determined for each of the defined events during an execution of the program, and each sequence of values is then compressed to generate a compressed sequence of values for each event. These values are then ordered in accordance with information stored in selected events (such as for example, branch events), where the ordered values correspond to the trace.

Often, when an event generates a regular pattern of values, it presents an opportunity for optimization of the corresponding event. Data prefetching and branch prediction are popular examples of this phenomenon. The representation of the trace greatly influences how easily such patterns can be detected and how architectures can react to them. Our proposed compression and representation renders several such opportunities as described below.

With this invention complete execution information is captured and can be used for simulation experiments for studying architectural and program variations.

With this invention values for repeatedly executed events are captured in a very compact form. This compressed form of event-values acts as a signature for the behavior of the event and can be used for analysis and optimization.

BRIEF DESCRIPTION OF THE DRAWINGS

FIG. 5 graphically illustrates addresses prefetching using compressed patterns of selected events.

DESCRIPTION OF THE INVENTION

Control Flow Representation

The binary code of a program can be statically decomposed into a sequence of blocks 11, where each block is a sequence of instructions 15 and 16 in program order, so that the last instruction in a block is always a branch 16, while all preceding instructions in the block are non-branch instructions 15. During execution, normally control enters at the beginning of a block, after which all subsequent instructions of that block are executed before control transfers to another block. Each block can be uniquely identified in a program. These blocks are used as the basic units in the control flow representation. Control flow is recorded by capturing the flow between blocks. At times, control may enter at an offset into a block. These situations can be handled by remembering the entry offset into a block.

Figure 1:
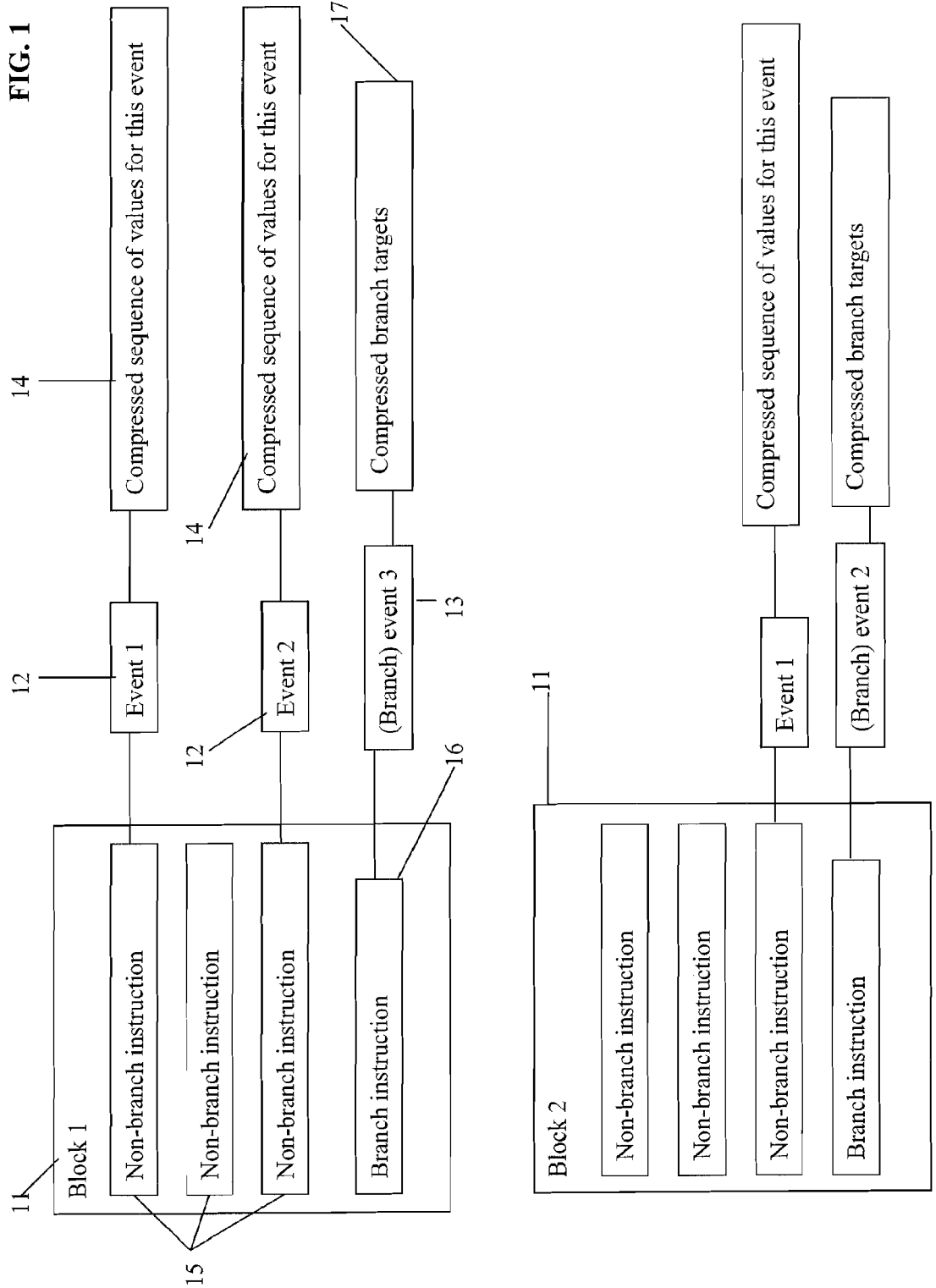
FIG. 1 graphically illustrates a block which includes a sequence of instructions, along with events and their associated compressed sequences.

Each block is associated with a sequence of events such as 12 or 13. Each event has a designated type and the type determines the length of the associated event-value. Events can include, for example, loading and storing into memory, branching, memory allocation, and parallel execution constructs. Typically an event is associated with an instruction of the block. For instance, in order to track memory references, load/store instructions are associated with address-events, where the address referenced is the corresponding event-value. While the event value is not shown in FIG. 1, it becomes incorporated into a compressed sequence of values 14. The branch instruction 16 at the end of a block is associated with a branch-event 13, and the corresponding event-value is the identity of the block to which control transfers after the branch is executed (See FIG. 1). While the event value for the branch target is not shown in FIG. 1, it becomes incorporated into a compressed sequence of values 17.

During execution, each time a block is executed, all of its events occur in the order of the execution. For each block 11 visited during execution, our mechanism maintains the list of event-values 14 for that event in a compressed manner. While a variety of compression mechanisms may be designed, we describe here our favored mechanism. Describe below is how a list of event-values is maintained and compressed. First we describe the basic rules we employ to compress an arbitrary sequence of values.

Compression Rules

Our compression mechanism captures only very simple kinds of repetitions: strided sequences of values and repeated strided sequences. A sequence of values is represented as a sequence of patterns, where each pattern is either a strided pattern or a repeat pattern.

Figure 2:
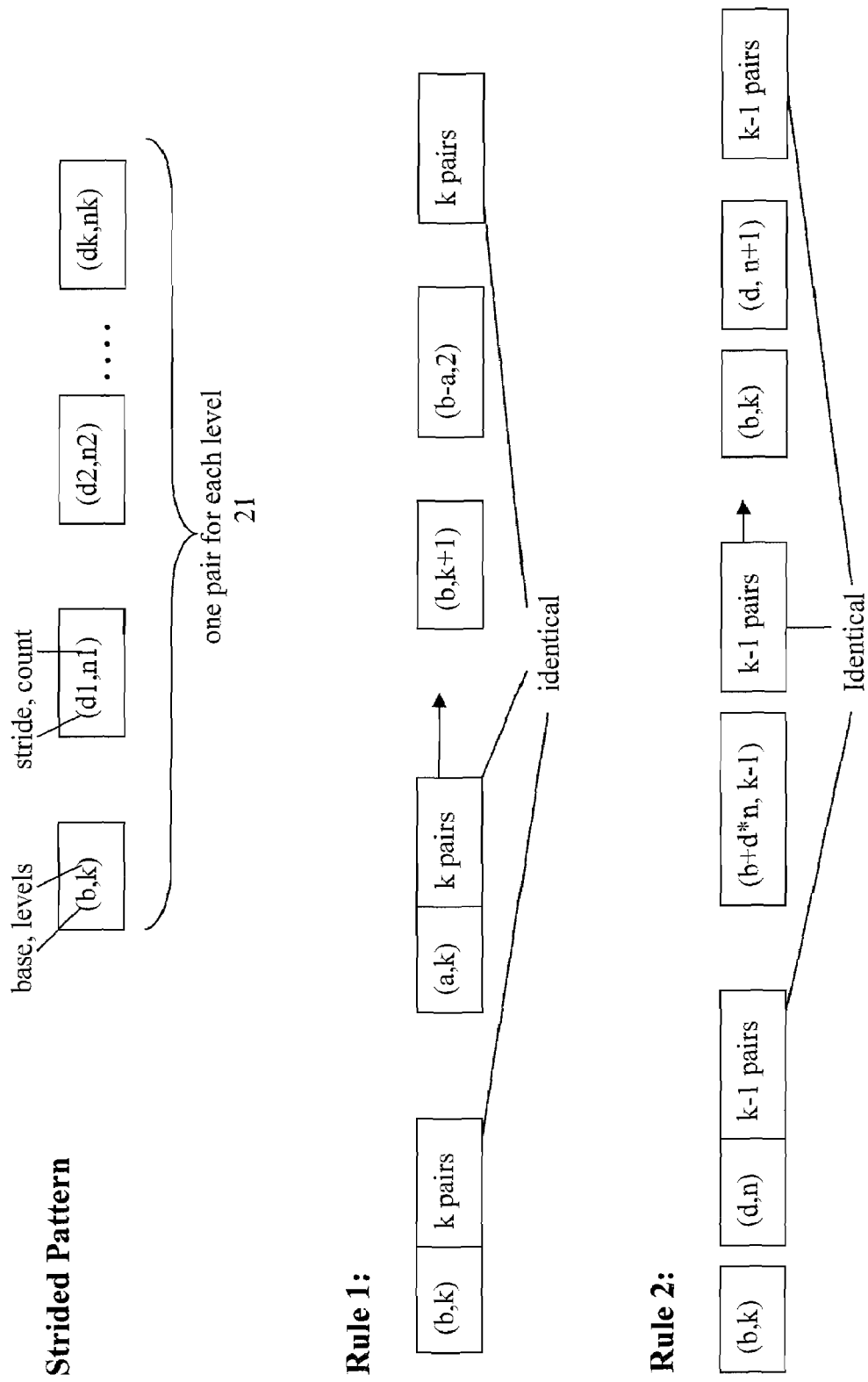
FIG. 2 graphically illustrates the strided pattern reduction rules.
Figure 3:
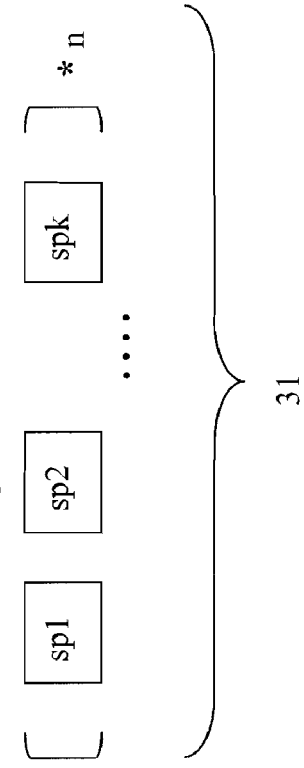
FIG. 3 graphically illustrates the repeated pattern reduction rules.

Referring to FIG. 2, a strided pattern (sp) (21) is of the form, [(b, k), (d1,n1), (d2,n2), . . . , (dk,nk)], where b is called the base pattern, k is the depth of nesting, the di are the strides and ni are the number of times a stride is applied. It stands for the sequence of (n1*n2* . . *n2) values produced by the pseudo-code: for(i1=0;i1<n1;i1++)for(i2=0;i2<n2; i2++) . . . for (ik=0; ik<nk; ik++) print (b+i1*d1+i2* d2+ . . . +ik*dk). A single value, v, is represented by the single pair [(v, 0)]. Referring to FIG. 3, a repeat pattern (rp) (31) is of the form, {sp1, sp2, . . . , spk}*n, where spi are strided patterns and n is the repeat count. It simply represents the specified sequence of strided patterns repeated n times. Patterns are formed according to the following simple replacement rules:

Rule 1: (See FIG. 2)
[(b,k),(d1,n1),(d2,n2), . . . , (dk,nk)], [(a^=b,k),(d1,n1),(d2, n2), . . , (dk,nk)]
is replaced by [(b, k+1),(b−a, 2) (d1, n1), (d2, n2) . . . (dk,nk)]

Rule 2: (See FIG. 2)
[(b, k), (d1,n1), (d2,n2), . . , (dk,nk)], [(b+d1*n1, k−1),(d2, n2), . . , (dk,nk)]
is replaced by [(b, k), (d1, n1+1), (d2, n2) . . . (dk,nk)].

Rule 3: (See FIG. 3)
sp1, sp2 . . . spk, sp1, sp2 . . . spk
is replaced by [sp1, sp2 . . . spk]*2

Rule 4: (See FIG. 3)
{sp1,sp2 . . . spk}*n, sp1, sp2 . . . spa
is replaced by [sp1, sp2 . . . spk]*(n+1)

Compression Mechanism

The trace mechanism maintains the list of blocks executed at any time. The first time, a block is executed, it is added to the list and the value-sequence is initialized to NULL for each of the events of that block. As each value v is obtained for an event, its value-sequence is updated as follows:

1. The strided pattern [(v, 0)] is appended to the right of its value-sequence.
2. Repeatedly reduce the two rightmost patterns of the sequence by rules 1 or 2 when applicable.
3. Search the sequence, from right to left, until either the rightmost pattern is repeated, as in rule 3 or a repeat pattern is found as in rule 4. If none, quit.
4. Reduce by rule 3 or 4, as applicable.

Trace Compression and Decompression

Our preferred storage mechanism for the trace is to store the list of all the blocks encountered in the execution and for each block, the value-sequences of each event of that block are also stored. Given a compressed trace, the decompression is the process of generating the sequence of blocks visited by the execution and for each visit of a block, generating the values corresponding to each event of that block. This can easily be done, by the following algorithm. The algorithm maintains two pointers: current-block and current-event, which are initialized to point to the first block and the first event in that block, respectively. For each strided sequence of the form [(b, k),(d1,n1), (d2,n2), . . . , (dk,nk)] additional counters, ci, are maintained as shown in [(b, k), (d1,n1,c1), (d2,n2,c2), . . . ,(dk,nk,ck)]. The counters ci are all initialized to zeroes and are used for enumeration. The following steps are repeated until all values are generated:

1. If the head of the value-sequence of the current-event is a strided pattern of the form [(b, k),(d1,n1,c1),(d2, n2,c2), . . . ,(dk,nk,ck)], then compute the event-value v=(b+c1*d1+c2*d2+ . . . +ck*dk) and advance the counters lexicographically. That is, find the largest 1<=i<=k such that ci<di−1 and increment ci and reset all cj, j>i to zero. If no such i is found, delete this pattern from the sequence.
2. If the current-event is a branch-event, then reset the current-block to the block identified by v and reset the current-event to its first event.
3. Otherwise generate the value v and advance current-event to the next event in the current-block.

Segmented Traces

In the preceding description, as the trace grows longer, the number of blocks 11 maintained increases and hence searching for them to record the control flow becomes slower. The events and compressed sequences of values (12, 13, 14, and 17) are again shown in FIG. 4. Furthermore, during decompression, blocks will have to be read from the trace in a criss-cross manner, depending upon the structure of the code. To alleviate these problems and to facilitate direct processing of selected portions, we describe the following segmentation scheme, (See FIG. 4). While there can be a variety of criteria for determining segment 41 boundaries, described below is our preferred approach, based on the size of a compressed segment. The idea is to be able to read each segment into memory once and complete all its processing within the memory.

The trace compression algorithm described in the preceding sections is such that a segment can be terminated after any branch instruction (i.e. at the end of any block). As a segment is composed, one can estimate the size of the compressed segment, based on the number and type of patterns the segment has at any time. If the size exceeds a chosen threshold, the segment is terminated at the end of the current block. This is indicated by specifying the last branch target as a block which does not exist in the current segment.

Figure 4:
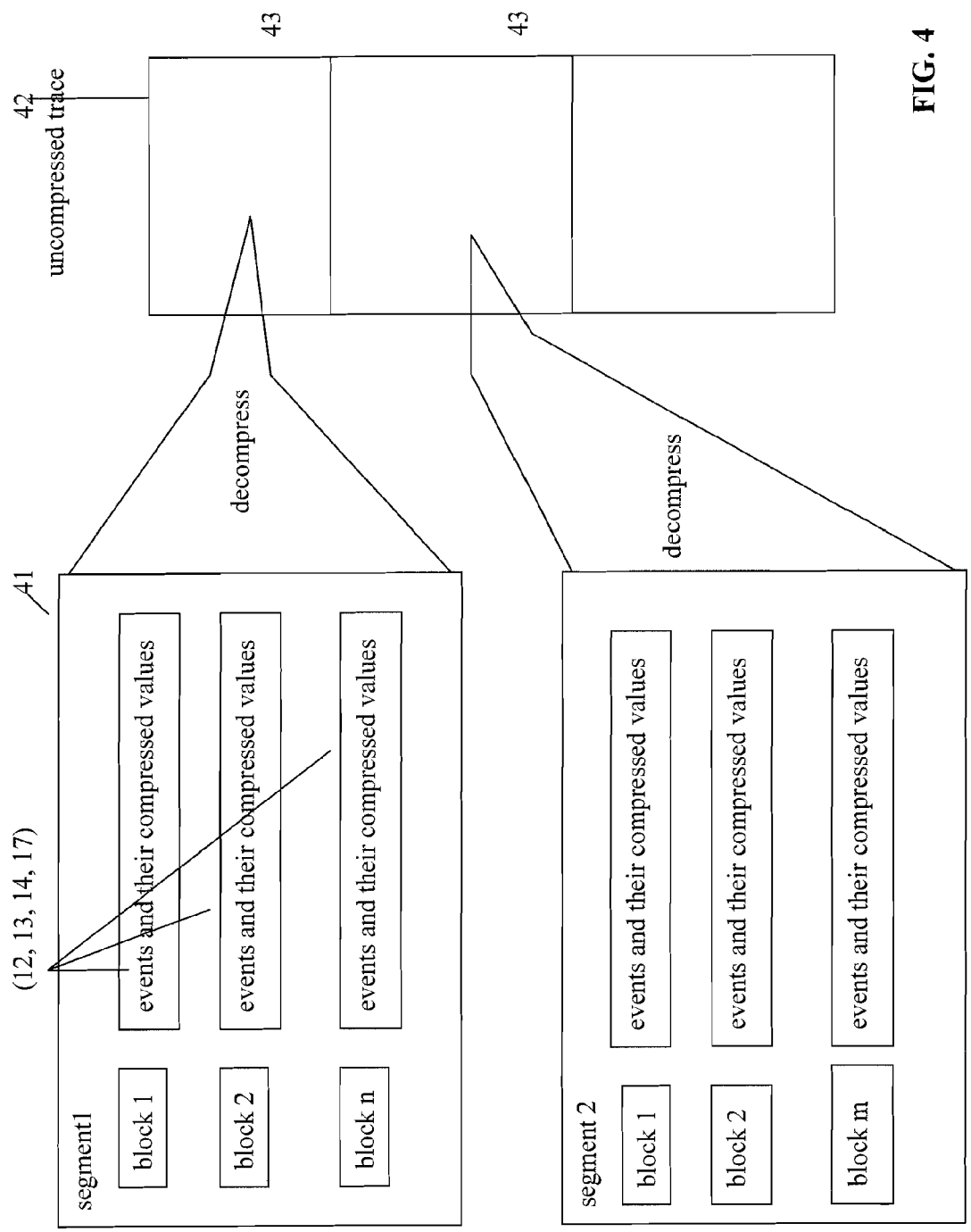
FIG. 4 graphically illustrates segmentation of compressed values and their decompression to a contiguous sequence of values in the uncompressed trace.

The segment is written out and a new segment starts with empty value-sequences. Referring to FIG. 4, when each compressed segment is decompressed, one gets a contiguous sequence of values 43 in the uncompressed trace 42. While one loses the opportunity to compress patterns that spread across segments, the segments offer greater flexibility in handling the trace. An index listing the file offsets to individual segments facilitates seeking to a desired segment and processing it concurrently with processing of other segments.

Hardware Aids for Data Pre-Fetching

The preceding discussion focused on generating a compressed trace and processing decompressed traces. Analysis from previous executions of programs can identify events in the control flow that have a well-structured strided reference pattern and software can supply hints to the hardware at appropriate places to initiate data pre-fetches. The same idea can also be used to build automatic data pre-fetch mechanism. Illustrated below is a simple mechanism for pre-fetching strided patterns. Referring to FIG. 5, a processor 50 can be equipped with a pre-fetcher 54 that acts on hints supplied by software. Each memory fetch instruction 51 carries its signature (i.e. compressed pattern) 52 with it, when it is compact. The instruction is fed to the execution 53 unit and the signature is fed to the pre-fetcher. When the pre-fetcher receives a signature, it initiates the appropriate pre-fetch command to the memory subsystem. Alternatively the pre-fetcher can also be designed to do the online compression for selected events and trigger the pre-fetching when a stable signature is identified. Similar technique can be employed for the branch target-sequence to trigger branch prediction and hedge fetching.

The invention claimed is:

1. A computer-implemented method of creating a compressed memory reference trace for a program said compressed memory reference trace to be stored in memory associated with a computer running said program, said method comprising:
    selecting each sequence of events in a control flow for said program;
    obtaining a sequence of values for each of said events, which values were obtained by executing said program;
    compressing each said sequence of values to generate a compressed sequence of values for each event, wherein the collection of compressed sequences of values of events generates a compressed memory reference trace;
    ordering said values of said compressed memory reference trace according to information in said selected sequence of events in the control flow of said program to generate an uncompressed trace of said program; and
    storing at least one of said compressed memory reference trace and said uncompressed trace.

2. A method as recited in claim 1, wherein said values of said compressed memory reference trace are ordered in order of said selected events.

3. A method as recited in claim 1, wherein said sequence of events for said program is selected by dividing said control flow of said program into blocks of instructions and by associating an event with selected instructions in a block.

4. A method as recited in claim 3, wherein said program is divided into said blocks according to the occurrence of a branch instruction, where each block has only one branch instruction which is the last instruction in each said block.

5. A method as recited in claim 1, wherein each said sequence of values for each said event is compressed based upon recognized patterns in each said sequence.

6. A method as recited in claim 5, wherein said recognized patterns comprise at least one of the following patterns: strided patterns and repeat patterns.

7. A method as recited in claim 1, wherein said selected events are branch instructions and wherein values for latter said selected events are branch targets taken by said branch instructions.

8. A method as recited in claim 1, wherein said information comprises target addresses and wherein said selected events comprise branch instructions.

9. A method as recited in claim 1, further comprising the step of:
    using said compressed sequence of values for an event corresponding to a load instruction to pre-fetch values during the execution of a program.

10. A method as recited in claim 1, further comprising the step of:
    using said compressed sequence of values for an event corresponding to a branch instruction to perform branch prediction during the execution of a program.

11. A method as recited in claim 1, further comprising:
    dividing said compressed memory reference trace into segments, wherein said sequence of compressed values in a segment corresponds to a contiguous sequence of values in said uncompressed trace.

12. A method as recited in claim 11, wherein a segment is terminated at the end of a block such that the size of the segment is between two predetermined values.

13. The method as recited in claim 1 further comprising the steps of:
    analyzing said compressed memory reference trace to identify patterns of program behavior; and
    utilizing said patterns to optimize program execution.

14. The method as recited in claim 13 wherein said utilizing comprises performing pre-fetching.

15. The method as recited in claim 13 wherein said utilizing comprises performing branch prediction.

16. A program storage device readable by a digital processing apparatus and having a program of instructions which are tangibly embodied on the storage device and which are executable by the processing apparatus to perform a method of creating a compressed memory reference trace for a program for storage of said compressed trace in a memory associated with said processing apparatus, said method comprising:
    selecting each sequence of events for said program;
    obtaining a sequence of values for each of said events, which values were obtained by executing said program;
    compressing each said sequence of values to generate a compressed sequence of values for each event, wherein the collection of compressed sequences of values of all events generates a compressed memory reference trace for storage in a memory associated with said processing apparatus; and
    ordering said values of said compressed memory reference trace to generate an uncompressed trace of said program.

17. The program storage device as recited in claim 16 wherein the method further comprises the steps of:
    analyzing said compressed memory reference trace to identify patterns of program behavior; and
    utilizing said patterns to optimize program execution.

18. A computer apparatus for creating a compressed memory reference trace of a program, said apparatus comprising:
    means for selecting each sequence of events for said program;

means for obtaining a sequence of values for each of said events, which values were obtained by executing said program;

means for compressing each said sequence of values to generate a compressed sequence of values for each event, wherein the collection of compressed sequences of values of all events generates a compressed memory reference trace;

means for ordering said values of said compressed memory reference trace to generate an uncompressed trace of said program, and means for storing at least one of said compressed memory reference trace and said uncompressed trace.

19. The apparatus as recited in claim 18 further comprising:

means for analyzing said compressed memory reference trace to identify patterns of program behavior to exploit to optimize program execution.

* * * * *